United States Patent

[11] 3,547,417

| [72] | Inventor | Hans Peter Elkjaer<br>Copenhagen-Valby, Denmark |
|---|---|---|
| [21] | Appl. No. | 731,526 |
| [22] | Filed | May 23, 1968 |
| [45] | Patented | Dec. 15, 1970 |
| [73] | Assignee | F. L. Smidth & Co.<br>New York, N.Y.<br>a corporation of Delaware |

[54] ROTARY KILN ASSEMBLY
5 Claims, 4 Drawing Figs.

[52] U.S. Cl. .................................................. 263/32
[51] Int. Cl. ................................................... F27b 7/02
[50] Field of Search .......................................... 263/33, 32, 32A

[56] References Cited
UNITED STATES PATENTS

| 2,841,385 | 7/1958 | Muller | 263/33 |
| 3,012,765 | 12/1961 | Deussner | 263/33 |

Primary Examiner—John J. Camby
Attorney—Pennie, Edmonds, Morton, Taylor and Adams ABSTRACT: The combination of a rotary kiln and a stationary gas conduit having an inner surface inclined towards, but spaced from, the feed end of the kiln and an elongated trough, carried by the inner surface, that extends downwardly and protrudes into the feed end of the kiln.

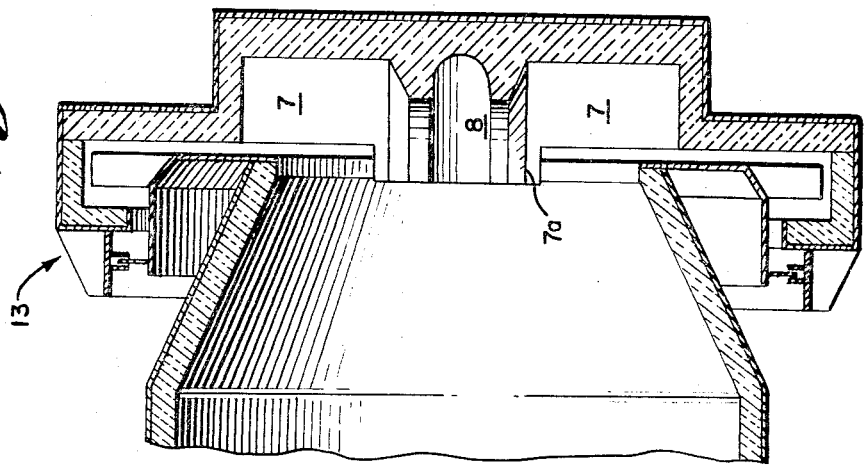
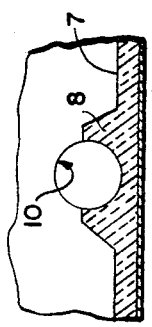
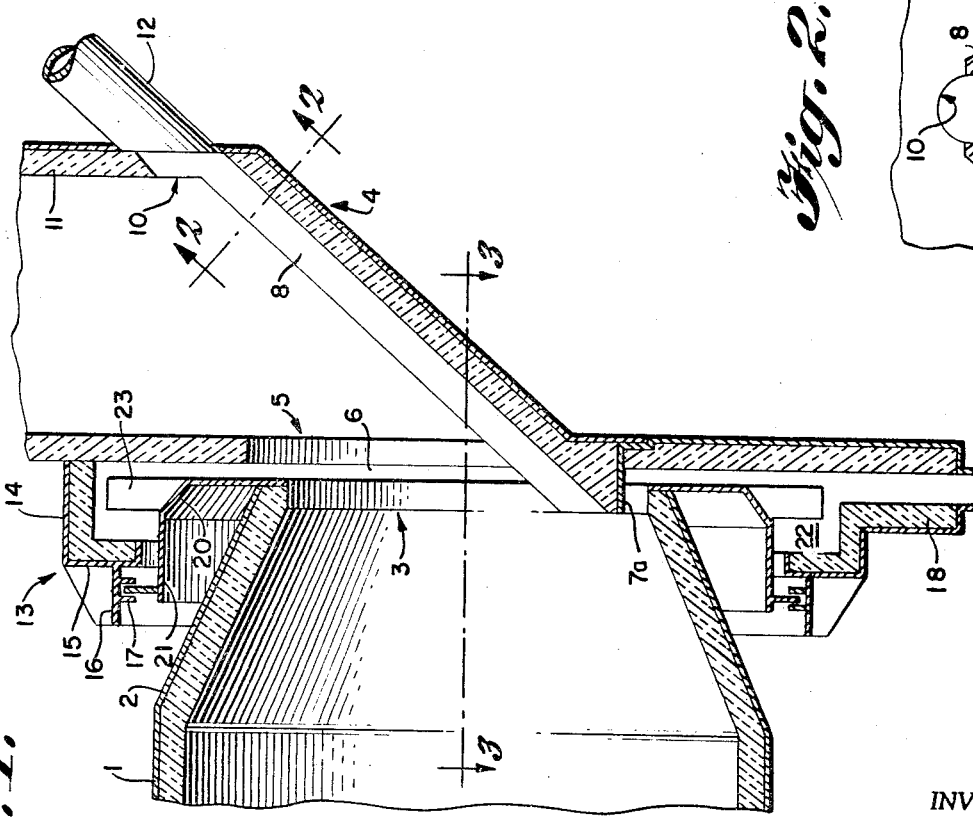
INVENTOR
HANS P. ELKJAER

INVENTOR
HANS P. ELKJAER

ROTARY KILN ASSEMBLY

BACKGROUND OF THE INVENTION

Cement clinker is commonly produced in a plant that includes a rotary kiln in which the raw materials are successively dried, preheated, calcined and burnt to clinker. Also a dust precipitator, such as an electrostatic filter or a bag filter is usually used so that the exhaust gases from the rotary kiln may be deprived of suspended dust, partly to prevent the dust from contaminating the surroundings and partly to recover at least part of the dust for the cement-making process. The temperature of the gases passed to the dust precipitator must be comparatively low. Otherwise the precipitator will be damaged. Also it is now common to couple the kiln to a preheater in which the raw meal is heated by the kiln gases, which are thus themselves cooled by the incoming raw material.

Now nearly all cement raw materials contain volatile constituents in the form of chlorine compounds and alkalies such as sulfates and carbonates. In the calcining and burning stages in the kiln, some of these constituents are volatilized and carried out of the calcining zone in the exhaust gases of combustion. When the gases meet the cooler raw meal in the preheater, the volatilized constituents condense on the particles of incoming raw meal. It has been found that a high content of alkali and chlorine compounds imparts a clogging tendency to raw meal. Further, the content of alkali and chlorine compounds may become so large that the hot raw meal could cake on the walls of the preheater. This caking is dependent primarily on the amount of alkali or chlorine compounds or both in the available raw meal, but among other things it is also dependent on the temperature at which the gases leave the kiln. Caking frequently occurs in cyclone preheaters, especially when they comprise more than two stages, since the use of a greater number of preheating units enables the kiln to be constructed with a shorter length which consequently results in higher temperatures of the gases leaving it than ordinarily when the kiln was of standard length. The higher temperature in turn increases the risk of caking which may substantially reduce the capacity of the cyclone preheater.

One way of reducing caking in a cyclone preheater is to cause a fraction of the gases to bypass the cyclone preheater, so that a corresponding fraction of the alkalies and chlorine compounds is simultaneously prevented from contacting the raw meal in the cyclone preheater. The solid alkali- and chlorine-bearing particles suspended in the bypass stream are then removed, for instance by passing this diverted stream through a cyclone separator. The diverted stream is subsequently returned to join the gases which have passed through the cyclone preheater. However, it has been found that this method reduces the economy of the overall plant because heat is lost in the bypass stream. This lost heat could have been utilized for more intense preheating of the raw meal prior to it being introduced into the kiln.

SUMMARY OF THE INVENTION

This invention relates to the combination of a rotary kiln having a feed inlet and a stationary gas conduit extending upwardly and outwardly therefrom. The gas conduit has an inner surface which is inclined downwardly toward the kiln and terminates a spaced distance outside of the feed end of the kiln. The inner surface also carries an elongated trough which extends downwardly along the inner surface and protrudes into the feed end of the kiln. The combination may be provided with a hood assembly arranged to gather any precipitated dust falling by gravity through the space or gap between the gas conduit and the rotary kiln for removal of the dust from the system through an appropriate outlet.

This invention contemplates a new technique whereby a suitable amount of precipitated dust entrained in the gas emanating from the kiln may be effectively and instantaneously removed without removing any substantial amount of gas from the gas stream which would otherwise substantially reduce the economy of the system.

Also this invention enables a desirable proportion of the dust to be removed such that the content of the alkali and chlorine compounds in the raw material passing through the preheaters is kept so low that the clogging tendency of the raw material is at least substantially reduced.

Further, using the system of this invention, raw material may be advantageously fed to a rather short rotary kiln which has a plurality of preheaters associated therewith even though the kiln gas exiting from the kiln would destroy a metallic raw material feed inlet pipe because of the extremely high temperature of the gas emanating from the kiln.

BRIEF DESCRIPTION OF THE DRAWINGS

FIG. 1 of the drawings shows a partial vertical sectional view of the rotary kiln assembly of this invention;

FIG. 2 is a partial sectional view taken along lines 2–2 of FIG. 1;

FIG. 3 is a partial horizontal sectional view of the kiln assembly of the invention taken along line 3–3 of FIG. 1.

DESCRIPTION OF THE PREFERRED EMBODIMENT

Figure 4:
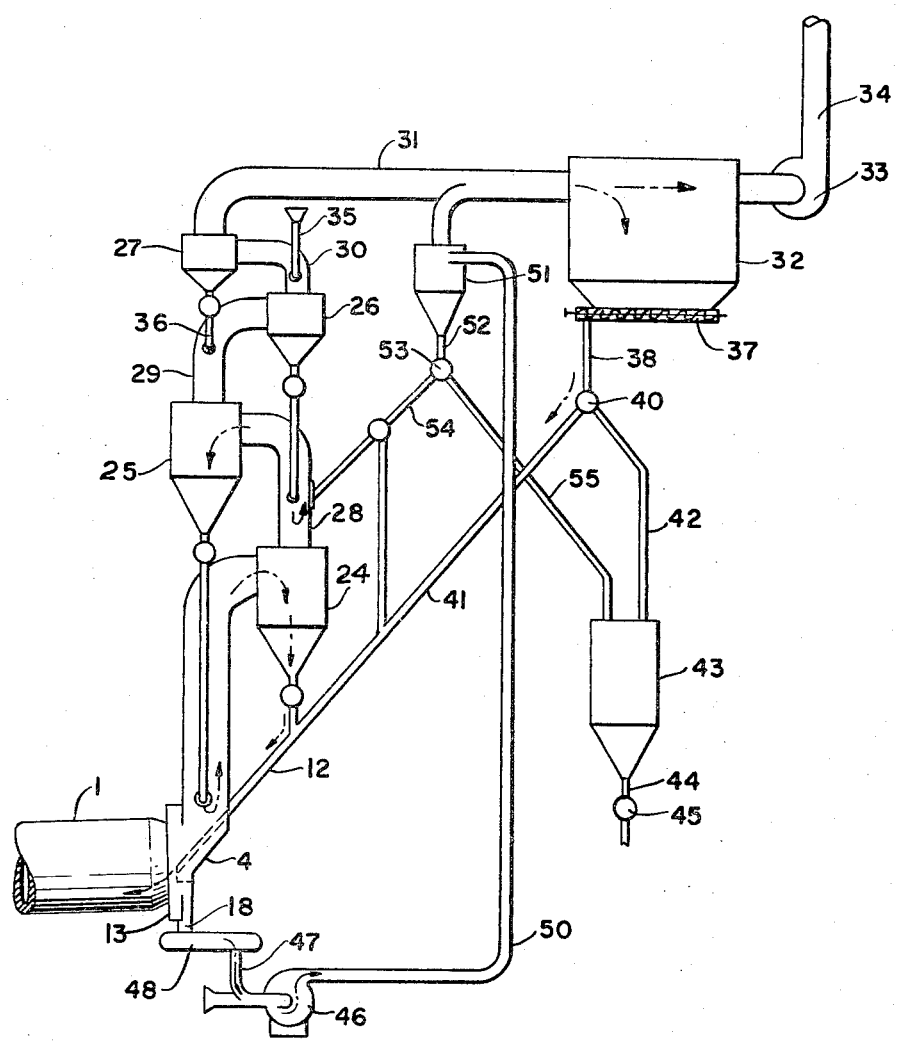
FIG. 4 is a diagrammatic view of an overall system using the kiln assembly of this invention.

FIGS. 1–3 illustrate the rotary kiln 1 used for the manufacture of cement by the dry process having a feed end 2 that forms a combined lower feed inlet and upper waste gas outlet 3.

Positioned immediately adjacent the feed end 2 of the kiln 1, there is arranged a gas conduit 4 which extends outwardly and upwardly from the kiln 1. The gas conduit 4 has a gas inlet opening 5 situated directly opposite the combined feed inlet and gas outlet 3 of the kiln 1. The space between the gas conduit 4 and the feed end 2 of the kiln 1 defines a gap 6.

The gas conduit 4 has a flat planar inner surface 7 which slopes downwardly toward the feed end 2 of the rotary kiln 1. The sloping inner surface 7 also carries a trough 8 which extends on a tongue-shaped extension 7a across the gap 6 between the kiln 1 and the gas conduit 4 and projects into the combined feed inlet and gas outlet 3 of the kiln 1, preferably through its lower portion. The trough 8 is arranged to extend along the entire length of the inner surface 7 approximately equidistant from the sides of the inner surface 7.

The other end of the trough 8 terminates at an aperture 10 in the upper sidewall 11 of the gas conduit 4. The aperture, itself, communicates with a material feed conduit or pipe 12 that is mounted to the gas conduit 4.

The exact dimensions of the planar inner surface 7 and the trough 8 are not critical. However, it is preferable that the width of the planar surface be approximately equal to the diameter of the circular combined feed inlet and gas outlet 3 of the kiln 1. Because of this factor, it can be observed that portions of the planar surface will extend beyond the edge of the combined feed inlet and gas outlet 3 as seen in FIG. 3.

As illustrated in FIG. 2, the cross section of the trough may be semicircular; however, other configurations are contemplated by this invention.

The gap 6 between the feed end 2 of the kiln 1 and the gas conduit 4 is surrounded by a cylindrical hood assembly, generally indicated by 13, which is mounted to extend from the gas conduit 4. The hood assembly 13 comprises a horizontally arranged cylindrical wall portion 14 which projects outwardly from the gas conduit 4 and a vertically arranged circular lip portion 15 which is mounted from the cylindrical wall portion 14 to extend toward the kiln 1.

The lip portion 15 carries a horizontally arranged circular flange 16 to which is attached a pair of vertically arranged annular rings 17 closely spaced from each other. These rings 17 project toward the feed end 2 of the kiln 1.

The lower end of the hood assembly 13 communicates with a dust outlet 18 which extends through the cylindrical wall portion 14.

A curved flange 20 is mounted to extend about the feed end 2 of the kiln 1. The flange 20 also carries a cylindrical extension 21 which extends in the same direction as the cylindrical wall portion 14. The horizontally arranged cylindrical extension 21 carries a single vertically arranged annular ring which extends upwardly therefrom and fits between the two annular rings 17 of the flange 16 of hood assembly 13 to form together a labyrinth gas seal for slideably sealing the interior of the rotary kiln from the atmosphere. The area thereby defined by the hood assembly 13, the curved flange 20 and cylindrical extension 21 is hereinafter referred to as an antechamber 22.

The curved flange 20 also carries a plurality of lifting vanes 23 which extend into the antechamber 22 to lift dust accumulating within the lower portion thereof to a point near the top of the antechamber 22 where the dust will leave the lifting vanes 23 so as to again drop through gap 6.

The kiln assembly of this invention is illustrated in FIG. 4 within a typical cement-producing system. The gas conduit 4, positioned adjacent the kiln 1, leads to a cyclone preheater assembly consisting of four individual cyclone preheaters 24, 25, 26 and 27, each connected to one another by conduits 28, 29 and 30.

A gas conduit 31 connects the top of the uppermost preheater 27 to a conventional dust precipitator 32 which collects the dust for return to the kiln 1. The clean gas from the precipitator 32 is withdrawn by blower 33 and dispersed to the atmosphere through conduit 34.

Raw material is introduced into preheater 27 through inlet pipe 35 which discharges it into the lower portion of the gas conduit 30. The raw material becomes suspended in the rising hot gas flowing through conduit 30 and is heated thereby. This action, in turn, cools the upwardly flowing gas. The raw material is carried by the rising gas in conduit 30 and is precipitated in the cyclone preheater 27 where it flows by gravity through pipe 36 which discharges it into the lower part of conduit 29 where it is again entrained by the upwardly flowing gas. This same procedure is followed with respect to cyclone preheaters 24 and 25 until the raw material is finally routed to conduit 12 for delivery to the trough 8 in the gas conduit 4 for transfer to the kiln 1.

The dust precipitated in the precipitator 32 falls to the bottom thereof and is removed by screw conveyor 37 which carries it to a vertical pipe 38. A multiposition valve 40 is mounted within this pipe 38. In one valve position, all dust is directed to pipe 41 which discharges it into pipe 12 for passage to the trough 8. In the other position of the valve 40, a portion of the dust is passed into the pipe 42 which leads to a storage container 43 which is provided with a bottom container outlet 44 and discharge valve 45. From time to time a vehicle is brought under container outlet 44 and discharge valve 45 is then opened so that the dust in the container 43 may be discharged into the vehicle.

The dust discharge outlet 18 associated with the hood assembly 13 communicates with a blower 46 through suction pipe 47 and chain conveyor 48. The dust thereby suspended in air is forced by the blower up through a connecting pipe 50 to a cyclone separator 51. In the cyclone separator, the dust is precipitated and removed by gravity through vertical pipe 52 which also carries a multiposition valve 53 associated therewith. The multivalve 53 is constructed so that vertical pipe 52 may be put into communication with pipe 54 for delivery of the dust back towards the kiln or the dust may be routed through pipe 55 to the storage container 43 for ultimate removal from the system.

Thus it can be observed that by appropriately setting the position of multivalve 53, it is possible to regulate the content of alkali or chlorine compounds in the gases passing through the gas conduit 4. For it has been found that as the amount of dust carried away through the pipe 55 increases, the content of the alkali or chlorine compound in the raw material passing into the conduit 4 will be decreased.

The amount of the dust that should be removed after it leaves the kiln in order to eliminate the clogging phenomenon aforementioned has been found to be comparatively small in quantity. For example, if about 5 to 15 percent of the total amount of the dust leaving the kiln is removed, satisfactory conditions are present.

In the operation of this invention fuel is burned in the rotary kiln 1 and the hot gaseous combustion products pass up through the kiln across the gap 6 into the gas conduit 4 and eventually through the preheaters 24, 25, 26 and 27.

The raw material is introduced into the system through pipe 35. The raw material is preheated by the preheating assembly and is routed to the gas conduit 4 for delivery to the kiln. The raw material passes into the kiln where it is sintered to cement clinkers in the kiln burning zone which is at a temperature of about 1,450° C. As the raw material approaches this zone, the alkali and chlorine compounds contained therein are volatilized and are carried upward through the kiln with the gases. As the compounds approach the comparatively cold feed end 2 of the kiln, some begin to condense as droplets or solid particles on the colder incoming raw material with the result that they are carried back into the kiln. Thus a closed circulation of alkali and chlorine compounds is set up in the kiln. This recirculation does not cause any problems in the kiln since the raw material will not stick to the hot walls of the kiln.

The entrained alkali or chlorine compounds, routed to the preheaters, are kept at a suitable and desirable level since some of them precipitate in the gas conduit 4 and fall directly from the gases through the gap 6. Further, some of the alkali and chlorine compounds slide down the inclined inner surface 7 of the gas conduit 4 and fall through the gap 6 into the antechamber 22. Any dust accumulating in the antechamber may be removed from the system by discharge through the discharge outlet 18.

The temperature of the gases passing from the kiln to the gas conduit immediately adjacent thereto, when a four-stage preheating system is used, is between about 1100—1300°C. whereas the exiting gases would be at a temperature of about 900° C. if a two-stage preheating assembly was coupled to the kiln. Further, the temperature of the raw material entering the kiln in accordance with the four-stage preheating assembly of this invention would be about 650° C. whereas in the two-stage assembly the temperature would be about 750—850° C.

Having thus described the invention, with particular reference to the preferred forms thereof, it will be obvious to those skilled in the art to which this invention pertains, after understanding the invention, that various changes and modifications may be made therein without departing from the spirit and scope of the invention, as defined in the claims appended hereto.

I claim:

1. In combination with a rotary kiln having a feed end, a stationary gas conduit adjacent said feed end and extending upwardly and outwardly therefrom, said gas conduit and kiln being spaced from one another to define a gap, a hood secured to the gas conduit and surrounding said gap, and a material outlet mounted at the lower end of the hood to remove material falling down through said gap and accumulating in the hood, said gap conduit having an inner surface which is inclined toward the kiln and has a tongue-shaped extension bridging said gap and protruding into the kiln, said tongue-shaped extension greatly restricted in width so that its edges are spaced substantial distances from the inner wall of said feed end, said inner surface of said tongue-shaped extension carrying a trough which extends across said gap and protrudes into the feed end of the kiln.

2. The combination of claim 1 wherein said inner surface is planar and said trough extends along the entire length of the inner surface and its tongue-shaped extension.

3. The combination of claim 2, wherein said trough extends into the lower portion of the feed end of the kiln.

4. The combination of claim 3 wherein said hood is in slidable sealing engagement with the rotary kiln.

5. The combination of claim 4 wherein a plurality of lifting vanes are fixed to the rotary kiln feed end so as to extend within the hood.